United States Patent [19]

Linscott, Jr.

[11] 4,054,856
[45] Oct. 18, 1977

[54] CURRENT TRANSFORMER ASSEMBLY FOR DYNAMOELECTRIC MACHINES

[75] Inventor: Phillip S. Linscott, Jr., Rockford, Ill.

[73] Assignee: Sundstrand Corporation, Rockford, Ill.

[21] Appl. No.: 721,256

[22] Filed: Sept. 8, 1976

[51] Int. Cl.² .................. H01F 27/06; H01F 40/06
[52] U.S. Cl. ............................ 336/84 M; 310/68 R; 336/92; 336/174
[58] Field of Search ............. 336/65, 84, 90, 92, 336/173, 174, 175; 310/68 R, 67 R, 68 D, 68 C, 72

[56] References Cited

U.S. PATENT DOCUMENTS

| | | | |
|---|---|---|---|
| 1,736,994 | 11/1929 | Claytor et al. | 336/174 |
| 3,175,174 | 3/1965 | Simmons | 336/92 |

*Primary Examiner*—Thomas J. Kozma

*Attorney, Agent, or Firm*—Ted E. Killingsworth; Michael B. McMurry; William R. Peoples

[57] ABSTRACT

In order to provide an electrically insulated and fluid-tight assembly for securing a current transformer to the inside of a dynamoelectric machine housing, a screw is inserted through an aperture in the machine's housing to secure the current transformer to a portion of the inner surface of the housing wherein a first insulating material is used to insulate the current transformer from the housing; a second insulator is used to insulate the screw from the housing; and an insulating cap is secured over the top of the screw. An O-ring provides a fluid-tight seal between the cap and the machine housing and a retaining ring is utilized to secure the cap over the screw's head within the machine housing. Secured to the lower part of the current transformer is a soft iron magnetic shield which is threaded to engage the screw and serves to support the current transformer.

20 Claims, 3 Drawing Figures

CURRENT TRANSFORMER ASSEMBLY FOR DYNAMOELECTRIC MACHINES

BACKGROUND OF THE INVENTION

The invention relates to dynamoelectric machines and more particularly, a means of securing a current transformer to the interior of the machine's housing.

Current transformers are typically used in three-phase machines to measure the current in each of the three-phase neutral leads of the main stator coils. In prior art dynamoelectric machines such as AC synchronous generators utilized in aircraft, the methods used to attach current transformers to the interior of the generator housing often give rise to a number of problems. For example, the current transformers are normally attached to the interior of the generator housing by means of a screw or a bolt which penetrates the housing of the generator, resulting quite often in leakage of cooling oil from the interior of the housing in those generators that utilize oil spray cooling. In addition, securing the current transformer by means of a screw or bolt that penetrates the housing can potentially result in a safety hazard since the mounting screw is frequently in contact with substantial electrical potentials from within the machine.

SUMMARY OF THE INVENTION

It is therefore an object of the invention to provide an arrangement for securing a current transformer to a dynamoelectric machine housing wherein the attachment provides a fluid-tight seal and is electrically insulated from electrical potentials.

It is a further object of the invention to provide an arrangement for securing a current transformer to the interior of a dynamoelectric machine housing wherein a fastening member is inserted through the housing and is effective to secure the current transformer to the interior of the housing; an insulator is interposed between the current transformer and the inner surface of the machine housing; an insulating member is used to space the fastening member from the machine housing; the upper portion of the fastening member is covered by a cap of insulating material; and the cap is further provided with a fluid sealing means to prevent cooling oil leakage past the cap.

It is another object of the invention to provide an arrangement for securing a current transformer to the inner surface of a dynamoelectric machine housing wherein: a fastening member is inserted through the housing effective to secure the current transformer to the inner surface of the housing; the current transformer is insulated from the housing; the fastening member is insulated from the housing and further covered by an insulating cap and wherein the arrangement also includes a flux shield secured to the lower part of the current transformer.

It is still another object of the invention to provide an arrangement for securing a current transformer to the interior surface of a dynamoelectric machine housing wherein the current transformer includes a magnetic shield; a fastening means is inserted through the machine housing and is engaged to the magnetic shield effective to secure the current transformer to the machine housing; and wherein a self-locking insert is utilized to engage the fastening member with the magnetic shield.

DETAILED DESCRIPTION OF THE INVENTION

Figure 1:
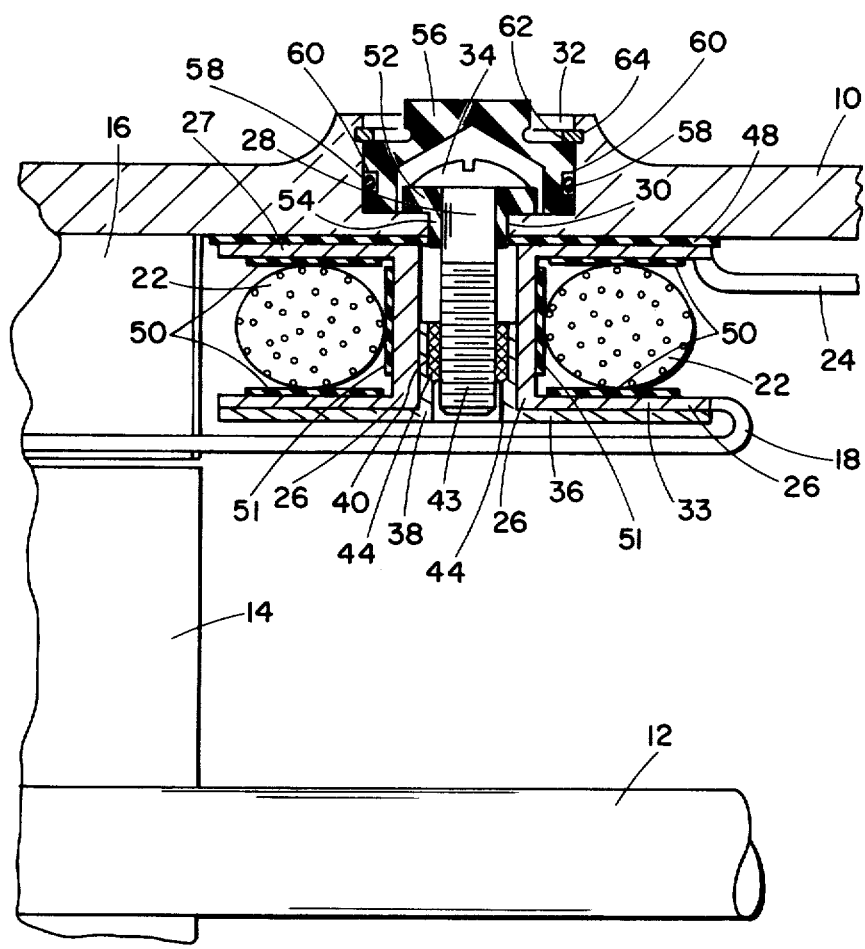
FIG. 1 is a partial longitudinal cross-section of a dynamoelectric machine including a longitudinal cross-section of a current transformer attachement structure.
Figure 2:
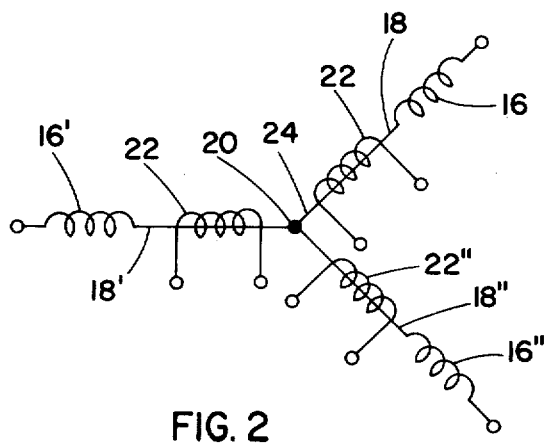
FIG. 2 is a schematic diagram of a dynamoelectric machine stator circuit.

FIG. 1 of the drawings is a longitudinal cross-section of a portion of a three-phase AC generator. Enclosed within a housing 10 (typically metallic) is a shaft 12 which supports a rotor 14 and secured to the housing 10 is a stator coil 16 that is electrically connected to a neutral lead 18. As is typical in three-phase alternating current machinery, there are three neutral leads, such as lead 18, connecting the stator coils to a neutral terminal. A schematic illustration of this type of circuit is provided in FIG. 2 wherein the neutral terminal is represented by terminal 20. In the schematic of a three-phase generator stator circuit in FIG. 2 there are three stator coils 16, 16', and 16", and three current transformers 22, 22', and 22". The current transformers 22, 22' and 22" are used to measure the amount of current flowing in the neutral leads 18, 18' and 18". In FIG. 2 stator coil 16, current transformer 22, and leads 18 and 24 correspond to stator coils 16, current transformer 22, and leads 18 and 24, respectively, of FIG. 1. In order to protect the generator from electrical malfunctions, it is often required to have a measure of the current in each of the neutral leads. One widely used approach is to measure the current in the neutral lead by means of a current transformer such as coil 22 which typically in aircraft generators, for example, is a coil having anywhere from 250 to 1000 turns.

In the preferred embodiment of the invention, the neutral lead 18 is connected to a spool-shaped transformer support member, shown in cross-sectional form at 26, which serves to both conduct the neutral lead current through the center of the coil 22 as well as serving as a support for the coil 22. Preferably the coil support member 26 is made of copper for maximum conductivity. Connected to an upper flange 27 of the support member 26 is the lead 24 which conducts the neutral current to the neutral terminal 20.

Figure 3:
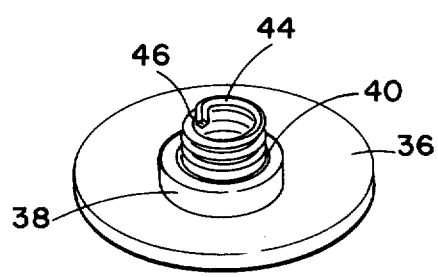
FIG. 3 is a perspective view of a magnetic flux shield including a helical coil used as a self-locking insert.

As shown in FIG. 1, a fastening device 28, such as a metallic screw, is inserted through an aperture 30 in the machine housing 10. The housing 10 is configured with an enlarged annular recessed area 32, coaxial with the aperture 30, for receiving the head 34 of screw 28. Engaging the lower flange 33 of the coil support member 26 is a circular transformer shield member 36 composed preferably of soft iron which includes a sleeve 38 configured with threads 40 for cooperating with the threads 43 of the screw 28. A perspective view of the circular member 36 is shown in FIG. 3. In addition to providing a mechanical connection for the screw 28, member 36 acts as a magnetic shield to reduce the electrical effects on coil 22 of magnetic fields that are often generated by the stator 16.

In order to lock the screw 28 to the current transformer, a self-locking insert, such as a helical coil as shown at 44 of FIG. 3, is inserted or screwed into the threads 40 in the sleeve 38 to prevent the screw or fastening member 28 from rotating due to the effects of vibration. In FIG. 3 the helical coil 44 is shown partially removed from the transformer shield 36 for clarity, although normally the coil 44 would be completely contained in the sleeve 38. Helical coils as at 44 are well-known in the art and may be similar to those defined by Military Part Number 21209, comprising a wound wire having a diamond-shaped cross-section, as shown at 46 of FIG. 3, which is very effective in preventing undesired rotation of a threaded member. In the preferred embodiment of the invention the helical coil 44 is screwed into the threads 40 of the sleeve 38 and the screw 28 is in turn screwed into the helical coil 44.

An annular disc of insulating material 48 is inserted between the housing 10 and the upper flange 27 of the coil support member 26 in order to insulate the support member 26 from the housing 10. In addition, the coil 22 is insulated from the copper support member 26 by means of annular discs of insulating material, indicated by the reference numerals 50, and an inner ring 51, so that the turns of coil 22 are not in electrical contact with the support member 26.

The upper portion of the screw 28 is spaced and insulated from the housing 10 by means of a collar-shaped insulator 52 which also provides for the support of the head 34 of screw 28. The insulator 52 includes a sleeve portion 54 that is inserted in the lower portion of the aperture 30 and serves to electrically insulate the shaft of the screw 28 from the housing 10. A cap 56 is inserted over the head of the screw 34 within the annular portion 32 of the housing. Preferably the cap 56 is made of an insulating material such as a molded plastic or a metal such as aluminum with an insulating varnish disposed on the outer surface. An O-ring, indicated by reference numerals 58, inserted in a groove 60 of the cap 56 provides a fluid-tight seal, thus preventing cooling oil from leaking past the screw 28 and out of the housing 10. This is a particularly useful feature in aircraft generators which utilize spray oil cooling. In addition, a snap ring 62 is engaged with a groove 64 in the annular portion 32 of the housing 10 to retain the cap 56 within the annular space 32. Thus, the cap 56, in combination with the O-ring 58 serves to both seal the housing from coolant leakage and to prevent the screw 28 from coming in electrical contact with anything outside of the housing thereby eliminating any danger from electrical potentials on the screw 28.

I claim:

1. A current transformer and a dynamoelectric machine housing assembly comprising:
    a current transformer;
    an aperture configured in the machine housing;
    a fastening member extending through said aperture in the housing and secured to said current transformer effective to secure said current transformer to the interior of the housing;
    a first insulating element interposed between said current transformer and the interior surface of the housing;
    a second insulating element interposed between said fastening element and the housing;
    covering means for enclosing the portions of said fastening means extending outwardly through said aperture in the housing;
    retaining means for securing said covering means to the housing; and
    sealing means cooperating with said covering means and the housing to provide a substantially fluid-tight seal for the aperture of the housing.

2. The assembly of claim 1 wherein said sealing means includes an O-ring retained in said covering means and in abutment with said aperture.

3. The assembly of claim 2 wherein said aperture in the housing is configured with a groove generally perpendicular to the axis of said aperture and said retaining means includes a retaining ring engaged with said groove.

4. The assembly of claim 3 wherein said covering means is composed of an insulating material.

5. The assembly of claim 4 wherein said fastening means includes a screw having a head with its lower portion threadably engaged with said current transformer and said head supported by said second insulating element.

6. The assembly of claim 5 wherein said covering means includes an annular chamber configured in the housing coaxial with said aperture for receiving the head of said screw.

7. The assembly of claim 1 wherein said current transformer additionally includes a magnetic flux shield, secured to the lower portion of said current transformer.

8. The assembly of claim 7 wherein said magnetic flux shield is secured to said fastening member.

9. The assembly of claim 8 wherein said magnetic flux shield is threadably engaged with said fastening member and further includes a self-locking insert to lock said fastening member within said magnetic flux shield.

10. The assembly of claim 9 wherein said self-locking insert is a helical coil.

11. A current transformer and a dynamoelectric machine housing assembly comprising:
    a current transformer;
    a portion of the housing configured with an aperture;
    a screw having a head at one end, extending through said aperture and threadably engaged with said current transformer;
    a first insulating element configured with an aperture for receiving the shaft of said screw and an upper portion interposed between said screw head and the lower portion of said aperture; and
    a cap secured within said aperture covering said screw head.

12. The assembly of claim 11 wherein said current transformer additionally includes a magnetic flux shield secured to the lower part of said current transformer including a threaded portion engaging said screw.

13. The assembly of claim 12 additionally including a self-locking insert in said threaded portion of said flux shield.

14. The assembly of claim 12 wherein said cap includes fluid sealing means.

15. The assembly of claim 14 additionally including a second insulating element interposed between the inner surface of the housing and said current transformer.

16. The assembly of claim 15 wherein said cap is composed of an insulating material.

17. A current transformer and a dynamoelectric machine housing assembly comprising:
    a generally spool-shaped coil support structure having upper and lower flanges;
    a transformer coil secured within said flanges;
    an aperture configured within said machine housing;
    a magnetic flux shield secured to said lower flange of said coil support structure;
    a screw having a head at one end, extending through said aperture and threadably engaged with said flux shield, effective to secure the upper flange of said coil support structure to the interior of the machine housing;

a first insulating element interposed between said upper flange and an inner surface of the housing a collar-shaped insulating element interposed between the head of said screw and the housing;

a cap composed of, at least in part, insulating material secured within said aperture effective to cover and electrically insulate said screw from contacts from without the machine housing; and a sealing element cooperating with said cap and said housing to provide a fluid-tight seal around said cap.

18. The assembly of claim 17 wherein said sealing means includes an O-ring contained within a groove configured in said cap.

19. The assembly of claim 18 wherein said cap is secured within said aperture by means of a retaining ring secured within a groove configured in said aperture.

20. The assembly of claim 19 wherein said magnetic flux shield is composed of soft iron.

* * * * *